No. 804,149. PATENTED NOV. 7, 1905.
A. MEYER.
COUPLING OR UNION.
APPLICATION FILED AUG. 1, 1904.
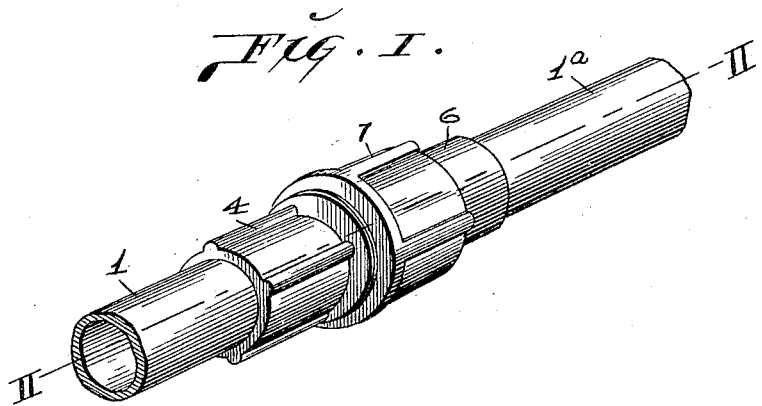
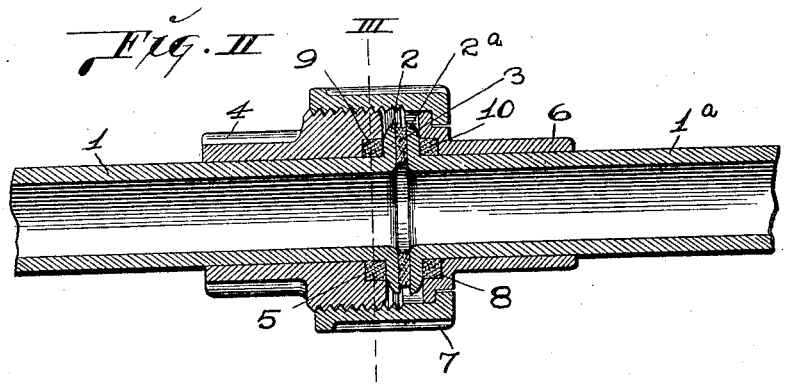
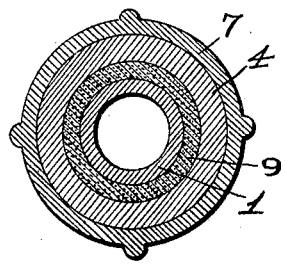
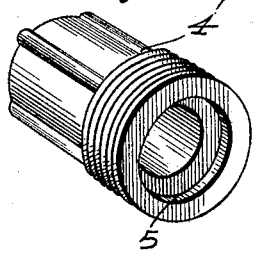
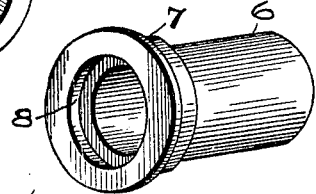
Attest:— Inventor:—
A. Meyer.
By Knight Bros. attys.

UNITED STATES PATENT OFFICE.

ADOLPH MEYER, OF ST. LOUIS, MISSOURI, ASSIGNOR OF ONE-HALF TO HENRY P. HOF, OF ST. LOUIS, MISSOURI.

COUPLING OR UNION.

No. 804,149. Specification of Letters Patent. Patented Nov. 7, 1905.

Application filed August 1, 1904. Serial No. 218,965.

*To all whom it may concern:*

Be it known that I, ADOLPH MEYER, a citizen of the United States, residing in the city of St. Louis, in the State of Missouri, have invented certain new and useful Improvements in Couplings or Unions, of which the following is a full, clear, and exact description, reference being had to the accompanying drawings, forming part of this specification.

My invention relates to an improvement in couplings or unions for uniting pipes having flanged ends, the improvement, briefly stated, consisting in the introduction of non-cutting rings within the coupling or union against the flanges of the pipes for the purpose of avoiding direct contact of the coupling members with said flanges to avoid liability of the flanges being cut when the coupling or union members are tightened. It is a well-known fact that in the use of soft metal pipes, such as those made of tin or lead and having offset or flanged ends at which the couplings or unions are located, that where the coupling members rest directly against the pipe-flanges they wear with considerable friction against the flanges in uniting and disconnecting them, and in many instances the pipes are rendered entirely unfit for use, due to the harder metal of the coupling or union members grinding against the pipe-flanges.

Figure I is a perspective view of a pipe-coupling in which my improvement is present. Fig. II is an enlarged longitudinal section taken on line II II, Fig. I. Fig. III is a cross-section taken on line III III, Fig. II. Fig. IV is a perspective view of the male member of the coupling. Fig. V is a perspective view of the female member of the coupling.

1 and 1$^a$ designate two sections of soft-metal pipe having at their ends flanges 2 and 2$^a$. Interposed between these flanges is a packing-ring 3.

4 designates the exteriorly-screw-threaded male member of the coupling, which is loosely seated on the pipe-section 1 adjacent to its flanged end. In the forward end of this male member is a socket 5.

6 is the flanged sleeve of the female member of the coupling, and 7 is the interiorly-threaded flanged collar of the female member. The sleeve 6 is loosely fitted to the pipe-section 1$^a$ and contains at its inner end a socket 8, and the collar 7 is interiorly screw-threaded to fit the threaded portion of the male member 4, as seen in Fig. II.

No invention *per se* is herein claimed for the general construction of the coupling members, they being of common form and adapted to be drawn together to hold the flanged ends of the pipe-sections when the female member collar is screwed onto the male member of the coupling.

In the socket 5 of the male member of the coupling is located a non-cutting ring 9, that is of softer material than the pipe-section 1 and the coupling member in which it is seated. In the female member sleeve-socket 8 is a non-cutting ring 10, that, like the ring 9, is of softer material than the pipe-section 1$^a$ and said sleeve.

In the use of a coupling made according to my improvement the rings 9 and 10 being located at the inner end of the male coupling member and inner end of the female member sleeve which face the end flanges of the pipe-sections withhold the parts of the coupling from direct bearing against the pipe-flanges when the coupling is tightened and loosened, and therefore all liability of the flanges being cut by the coupling members is eliminated, while at the same time the coupling members may be as tightly drawn together as they could be in the absence of the non-cutting rings, and the utility of the coupling is consequently unimpaired.

The sockets 5 and 8 in the male and female members of my coupling are, as illustrated, located within the inner ends of the male and female members. Therefore when the said members are drawn together with the flanged ends of the connected pipes between them the extreme inner ends of the coupling members may seat against the flanged ends of the pipes, as seen in Fig. II. The bottoms of the sockets 5 and 8 are, though, remote from the flanged ends of the pipes, and as a consequence the metal bodies of the coupling members cannot bear under any condition against the flanges of the pipes. Therefore although the coupling members be drawn so tightly together as to cause their extreme ends to bite into and cut the pipe-flanges in securing a tight joint in the coupling, the non-cutting rings 9 and 10 in the coupling member sockets serve to effect close-fitting joints without any liability of the inner portions of the pipe-flanges being damaged.

The non-cutting rings 9 and 10 may be of any suitable material—such as rubber, leather, fiber, or metal softer than the pipe-sections—and the coupling applied thereto. While I have described my improvement as used in couplings for uniting two pipe-sections each having a flanged end, it is obvious that either half of the coupling may be used in which the improvement is present and this half be connected to an iron or other pipe threaded as usual to receive said used portion.

I claim as my invention—

The combination with a coupling for pipes having flanged ends, of a pair of members having sockets at their inner ends extending rearwardly from the extreme inner ends of the members and within said extreme inner ends, of a pair of independent non-cutting rings seated in said sockets and adapted to bear against the flanges of the pipes when the coupling members are drawn together, substantially as set forth.

ADOLPH MEYER.

In presence of—
NELLIE V. ALEXANDER,
BLANCHE HOGAN.